(12) United States Patent
Holloway (10) Patent No.: US 6,371,557 B1
(45) Date of Patent: Apr. 16, 2002

(54) ROTARY DRIVE MECHANISM

(75) Inventor: Ian Pemberton Holloway, Stratford-upon-Avon (GB)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/662,525

(22) Filed: Sep. 14, 2000

(30) Foreign Application Priority Data

Sep. 14, 1999 (GB) .............................................. 9921615
Mar. 21, 2000 (GB) .............................................. 0006747

(51) Int. Cl.[7] ............................ F16H 1/32; B60N 2/235
(52) U.S. Cl. .................... 297/367; 297/362; 192/223.1; 74/144
(58) Field of Search ................................. 297/367, 362; 192/223.1; 74/144, 141; 267/150

(56) References Cited

U.S. PATENT DOCUMENTS 6,283,886 B1 * 9/2001 Schumann ................. 297/367

* cited by examiner

Primary Examiner—Robert Canfield
(74) Attorney, Agent, or Firm—Foley & Lardner (57) ABSTRACT

A lever operated rotary drive mechanism, the mechanism including a mounting frame carrying a rotary output member adapted for driving engagement with a rotary drive input, such as a shaft, an operating lever pivotally mounted on the mounting frame for pivotal angular displacement relative to the frame, biasing means for biasing the lever to a rest angular position, the lever being movable within a first angular displacement region located on one side of said rest position and movable within a second angular displacement region located on the opposite side of said rest position and a drive transmission which drivingly connects the lever to the output member to cause rotation of the output member in one rotary direction only on displacement of the lever within said first angular displacement region and to cause rotation of the output member in the opposite rotary direction only on displacement of the lever within said second angular displacement region.

7 Claims, 8 Drawing Sheets

ROTARY DRIVE MECHANISM

TECHNICAL FIELD OF THE INVENTION

The present invention relates to a lever operated rotary drive mechanism, in particular, but not exclusively a rotary drive mechanism for a seat reclining mechanism.

BACKGROUND

Reclinable vehicle seats are known which have a seat cushion pivotally connected to a seat back and a seat reclining mechanism which controls the inclination of the seat back relative to the seat cushion.

One known type of seat reclining mechanism, for example as disclosed in UK patent 1586869, is permanently engaged and provides continuous angular adjustment between the seat back and seat cushion. This type of seat reclining mechanism usually includes planetary gear assembly driven by a drive shaft. Rotation of the drive shaft in one direction causes angular displacement of the seat back in one direction (ie. backwards direction of the seat) and rotation of the drive shaft in the opposite direction causes angular displacement of the seat back in the opposite direction (ie. forwards direction of the seat).

An advantage of the continuously adjustable type of seat reclining mechanism is that the seat back is positively driven in both the forward and rearward directions.

A further advantage is that, due to the permanent engagement of the drive mechanism, the seat back and seat cushion are always mechanically locked together during adjustment thereby rendering the adjustment process safe.

Manual rotation of the drive shaft of the continuously adjustable type of seat reclining mechanism is conventionally achieved by mounting a handle on the drive shaft. Accordingly, the handle is located on one side of the seat immediately adjacent to the pivotal connection between the seat cushion and seat back.

Unfortunately access to the handle may be restricted in certain designs of vehicle (due to the position of structural components of the vehicle body and/or trim) or seats, eg. seats having arm rests.

In addition, the operative needs to twist the handle in order to apply torque to the drive shaft for operating the mechanism. This operation can be rendered more difficult when there is restricted access.

SUMMARY OF THE INVENTION

According to one aspect of the present invention there is provided a lever operated rotary drive mechanism, the mechanism including a mounting frame carrying a rotary output member adapted for driving engagement with a rotary drive input, such as a shaft, an operating lever pivotally mounted on the mounting frame for pivotal angular displacement relative to the frame, biasing means for biasing the lever to a rest angular position, the lever being movable within a first angular displacement region located on one side of said rest position and movable within a second angular displacement region located on the opposite side of said rest position and a drive transmission which drivingly connects the lever to the output member to cause rotation of the output member in one rotary direction only on displacement of the lever within said first angular displacement region and to cause rotation of the output member in the opposite rotary direction only on displacement of the lever within said second angular displacement region.

According to another aspect of the present invention there is provided a reclinable seat having a seat cushion pivotally connected to a seat back, a continually adjustable seat reclining mechanism having a rotary input for causing operation of the seat reclining mechanism and a lever operated rotary drive mechanism as defined above drivingly connected to said rotary input.

BRIEF DESCRIPTION OF THE DRAWINGS

Various aspects of the present invention are hereinafter described with reference to the accompanying drawings, in which.

DETAILED DESCRIPTION OF THE PREFERRED EMBODIMENT

Figure 1:
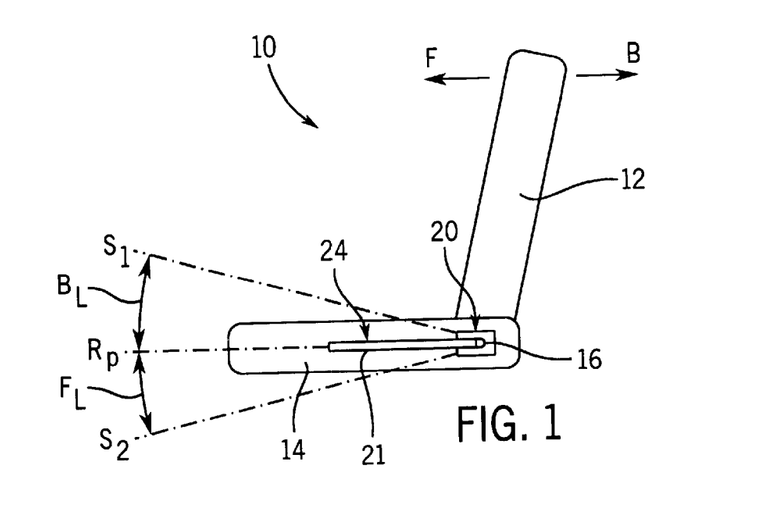
FIG. 1 is a schematic side view of a reclinable seat having a lever operated rotary drive according to the present invention.

Referring initially to FIG. 1 there is shown a reclinable seat 10 having a seat back 12 pivotally connected to a seat cushion 14. The seat back 12 may therefore be pivotally displaced about a pivot axis 16 in either the forwards direction F or the backwards direction B.

A continuously adjustable seat reclining mechanism (not shown) is provided for causing angular displacement of the seat back 12 about axis 16. The seat reclining mechanism includes a rotary input (not shown), for example a stub shaft which is rotated by a lever operated rotary drive mechanism 20 according to the present invention.

The rotary drive mechanism 20 includes an operating lever 21 which is pivotally mounted on a mounting frame 22. As described more fully below, the mechanism 20 includes a rotary output member 35 (FIG. 3) which drivingly engages with the rotary input of the seat reclining mechanism when the mounting frame 22 is fixedly attached to the frame of the seat 10.

As seen in FIG. 1, the operating lever 21 is biased to a rest position $R_p$ and extends forwardly of the seat 10 from the pivotal axis 16.

A hand grip region 24 is formed at the terminal end of lever 21. The length of lever 21 is chosen such that the hand grip region 24 is located at a convenient position forwards of axis 16 to enable an operative to grip and angularly displace the lever 21. This enables the hand grip region 24 to be located in a region which is more conveniently accessible to the operative.

The lever 21 is angularly displaceable upwardly from the rest position $R_p$ to a first limit position $S_1$ and is angularly displaceable downwardly from the rest position $R_p$ to a second limit position $S_2$.

As described in more detail below, movement of the lever 21 from its rest position $R_p$ in a direction toward the first limit position $S_1$ causes the seat reclining mechanism to be operated to move the seat back 12 in one direction (preferably in the backwards direction B) whilst movement of the lever 21 from its rest position $R_p$ in a direction toward the second limit position $S_2$ causes the seat back 12 to move in the opposite direction (preferably in the forwards direction F).

The extent of angular displacement of the lever 21 from its rest position $R_p$ to the limit position $S_1$ or $S_2$ is preferably chosen to be about 25° and this amount of angular displacement is preferably chosen to cause an angular displacement of about 4° of the seat back 12 relative to the seat cushion 14.

In order to achieve, in one direction, an angular displacement of the seat back 12 greater than that provided by a single movement or stroke of the lever 21 from its rest position $R_p$ to limit position $S_1$ or $S_2$, the lever 21 is drivingly connected to the output member 35 such that whilst the lever 21 is located in the angular region $B_L$ (defined between lever positions $R_p$ and $S_1$) movement of the lever toward stop position $S_1$ causes movement of the output member 35 in one rotary direction whilst movement of the lever 21 toward position $R_p$ causes no movement of the output member. This enables the lever 21 to undergo repeated reciprocal strokes whilst in region $B_L$ to cause the seat back 12 to be moved incrementally in one angular direction (viz. in the preferred example, in the backwards direction B).

Similarly, when the lever 21 is located in the angular region $F_L$ (defined between lever positions $R_p$ and $S_2$) movement of the lever 21 toward stop position $S_2$ causes movement of the rotary output member 35 in the opposite rotary direction (to that when the lever is in region $B_L$) whilst movement of the lever 21 toward the rest position $R_p$ causes no movement of the output member 35. Accordingly, repeated reciprocal strokes of the lever 21 whilst in angular region $F_L$ causes the seat back 12 to be moved incrementally in the opposite direction (viz. in the preferred example, in the forwards direction F).

Figure 2:
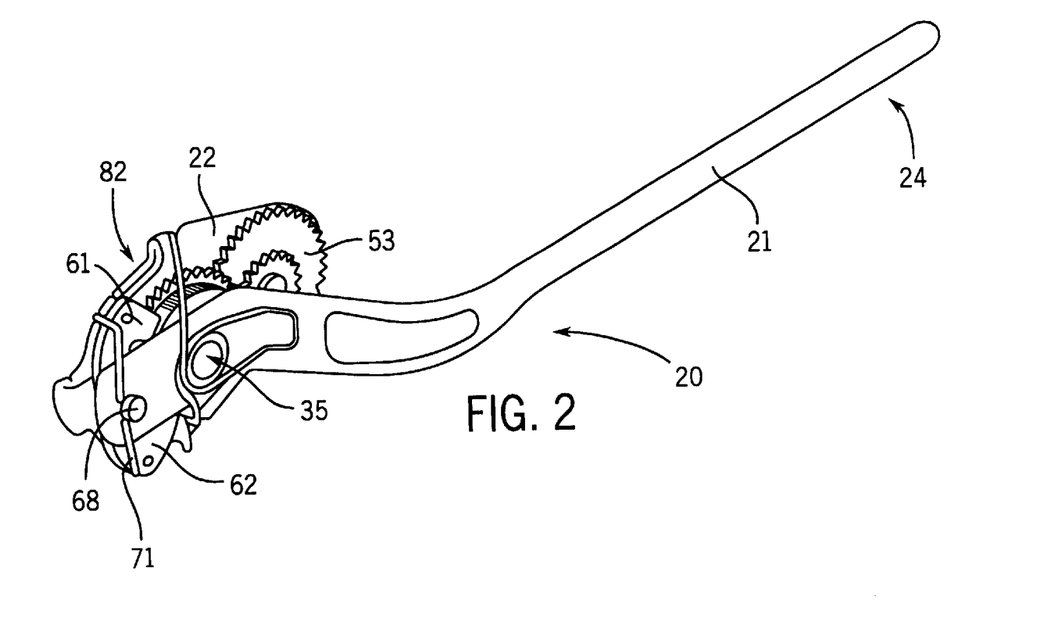
FIG. 2 is a perspective view of a lever operated rotary drive according to a preferred embodiment of the present invention.
Figure 3:
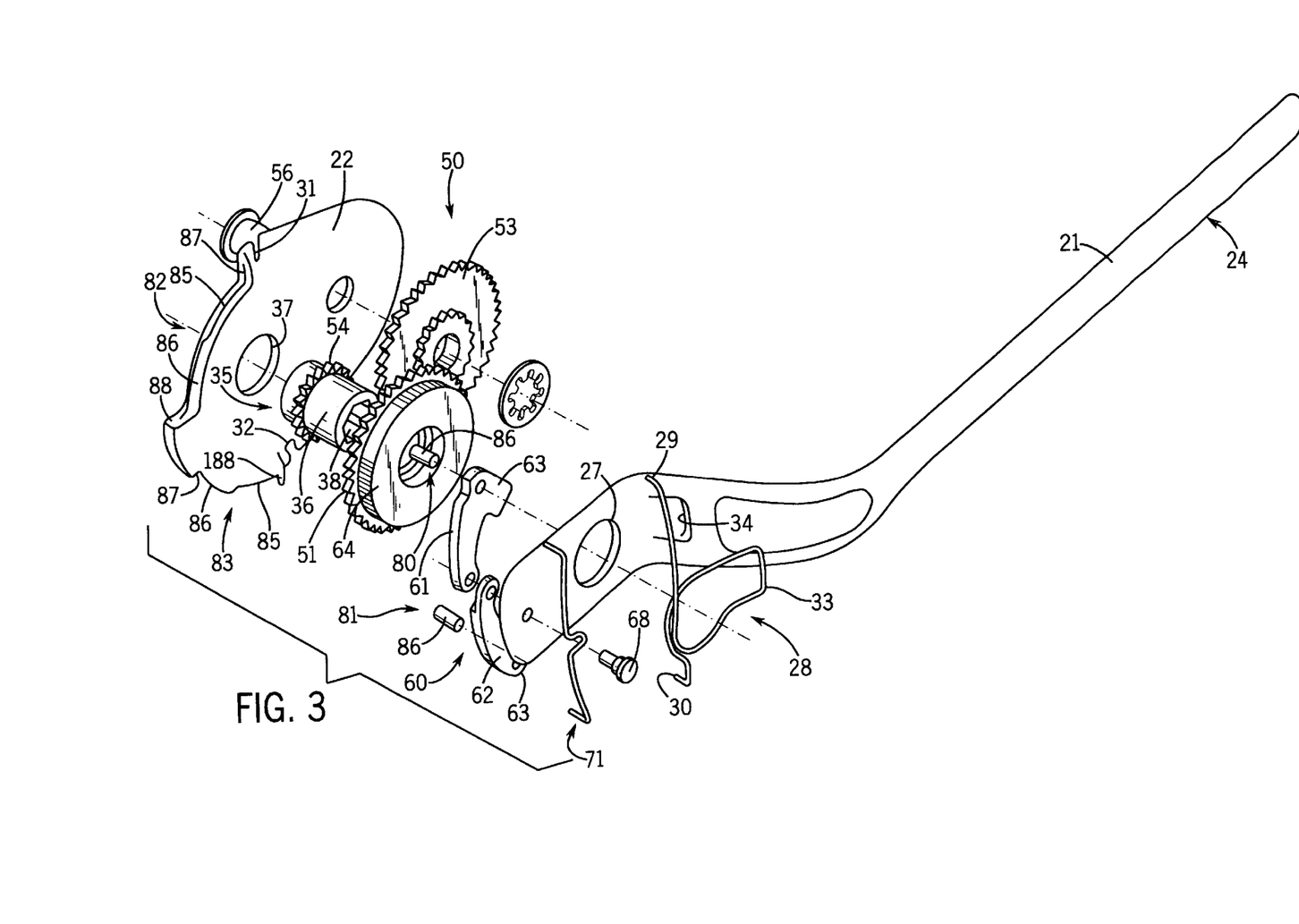
FIG. 3 is an exploded perspective view of the mechanism shown in FIG. 2.

A preferred embodiment of the lever operated drive mechanism 20 is illustrated in FIGS. 2 and 3.

As seen in FIG. 3, the output member 35 is preferably defined by a hollow shaft 36 which is rotatably received in an aperture 37 formed in the mounting frame 22.

The shaft 36 includes a through bore 38 which is of polygonal cross-section to thereby enable the rotary input, viz. a stub shaft, of the seat reclining mechanism to be axially inserted into the bore 38 when the mounting frame 22 is fixed to the frame of the seat 10. The stub shaft and bore 38 have complementary cross-sectional shapes and so are not rotatable relative to one another.

Preferably, the handle 21 includes an aperture 27 to enable it to be rotatably mounted on the shaft 36. Accordingly, lever 21 is pivotally mounted on the mounting frame 22 via shaft 36.

The biasing means for biasing the lever 21 to its rest position $R_p$ is preferably a spring 28 formed from a length of spring wire. Opposite ends 29, 30 of the spring 28 are anchored in openings 31, 32 formed in the mounting frame 22 and a central region 33 of the spring is located in an opening 34 formed in handle 21.

A drive transmission 50 is provided for drivingly connecting the lever 21 to the output member 35.

The drive transmission 50 includes a train of gears comprising a drive gear 51 rotatably mounted on the shaft 36, a driven gear 54 which is fixedly mounted on shaft 36, and a compound pinion gear 53 which meshes with both gears 51 and 54. Pinion gear 53 is rotatably mounted on a stub shaft 56.

Directional rotary drive means 60 are provided for drivingly connecting the lever 21 to the drive gear 51.

Preferably the drive means 60 includes a pair of pawls 61, 62 which are pivotally mounted on the lever 21 via a common pivot pin 68.

Pawl 61 is located so as to project to one side of the lever 21, and pawl 62 is located so as to project to the other side of the lever 21.

Both pawls 61, 62 have a toothed head 63 which meshes with a common toothed pawl wheel 64. Toothed pawl wheel 64 is fixedly secured to gear 51. Biasing means, preferably a spring 71 formed from a length of spring wire, are provided for resiliently biasing the heads 63 of both pawls in engagement with the pawl wheel 64.

Thus on displacement of lever in the upwards direction (ie. toward stop $S_1$), pawl 61 acts to rotate gear 51 in one direction (clockwise direction as viewed in FIG. 3) and on displacement of the lever 21 in the downward direction (ie. toward stop $S_2$), pawl 62 acts to rotate gear 51 in the opposite direction (viz. the anti-clockwise direction).

When the lever 21 is at its rest position $R_p$, the heads 63 of both pawls 61, 62 are in engagement with the pawl wheel 64.

In order to enable the lever 21 to perform a uni-directional displacement of the gear 51 when in angular region $B_L$ pawl 61 only operates upon the wheel 64 and similarly when in angular region F, pawl 62 only operates upon the wheel 64.

Preferably in order to achieve operative selection of pawl 61 or pawl 62, each pawl 61, 62 is provided with a cam follower 80, 81 respectively which co-operates with a co-operating cam track 82, 83 formed on the mounting plate 22.

Each cam track 82, 83 has a lower region 85 and an upper region 86.

When the lever 21 is moved into the angular region $B_L$, the cam follower 80 of pawl 61 remains in the lower region 85 of its cam track 82 whilst the cam follower 81 of pawl 62 rides onto the upper region 86 of its cam track causing the head 63 of pawl 62 to move out of engagement with the pawl wheel 64.

Thus whilst lever 21 is in region $B_L$ only pawl 61 operates upon wheel 64.

Similarly, when the lever 21 is moved into region $F_L$, the cam follower 80 of pawl 61 rides onto the upper region 86 of cam track 82 causing the head 63 of pawl 61 to move out of engagement with wheel 64. However, cam follower 81 of pawl 62 remains in the lower region 85 of cam track 83 and so remains in engagement with pawl wheel 64.

Conveniently, cam followers 80, 81 are in the form of pins 86. Preferably the mounting plate 22 is provided with stop shoulders 87, 88 which co-operate with the pins 86 to define the stop positions $S_1$, $S_2$ of the lever 21.

Three further embodiments are shown in FIGS. 4 and 5, FIGS. 6A to 6C, and FIGS. 7A–7C and 8 respectively.

Each of the embodiments provide:
 (a) optimised operating effort
 (b) optimised number of 'pump' operations for a given range of seat back adjustment
 (c) space, size and shape required
 (d) low cost In the embodiment illustrated in FIGS. 4 and 5, the lever 21 is pivotally mounted on a stub shaft 100 via bore 121 rotatably supported on shaft projection 108 and via a mounting plate 110 which is rotatably supported on shaft 100. The stub shaft 100 is mounted on a support plate 101 which includes mounting arms 103 which locate within slots 104 formed in the mounting frame 22.

Figure 4:
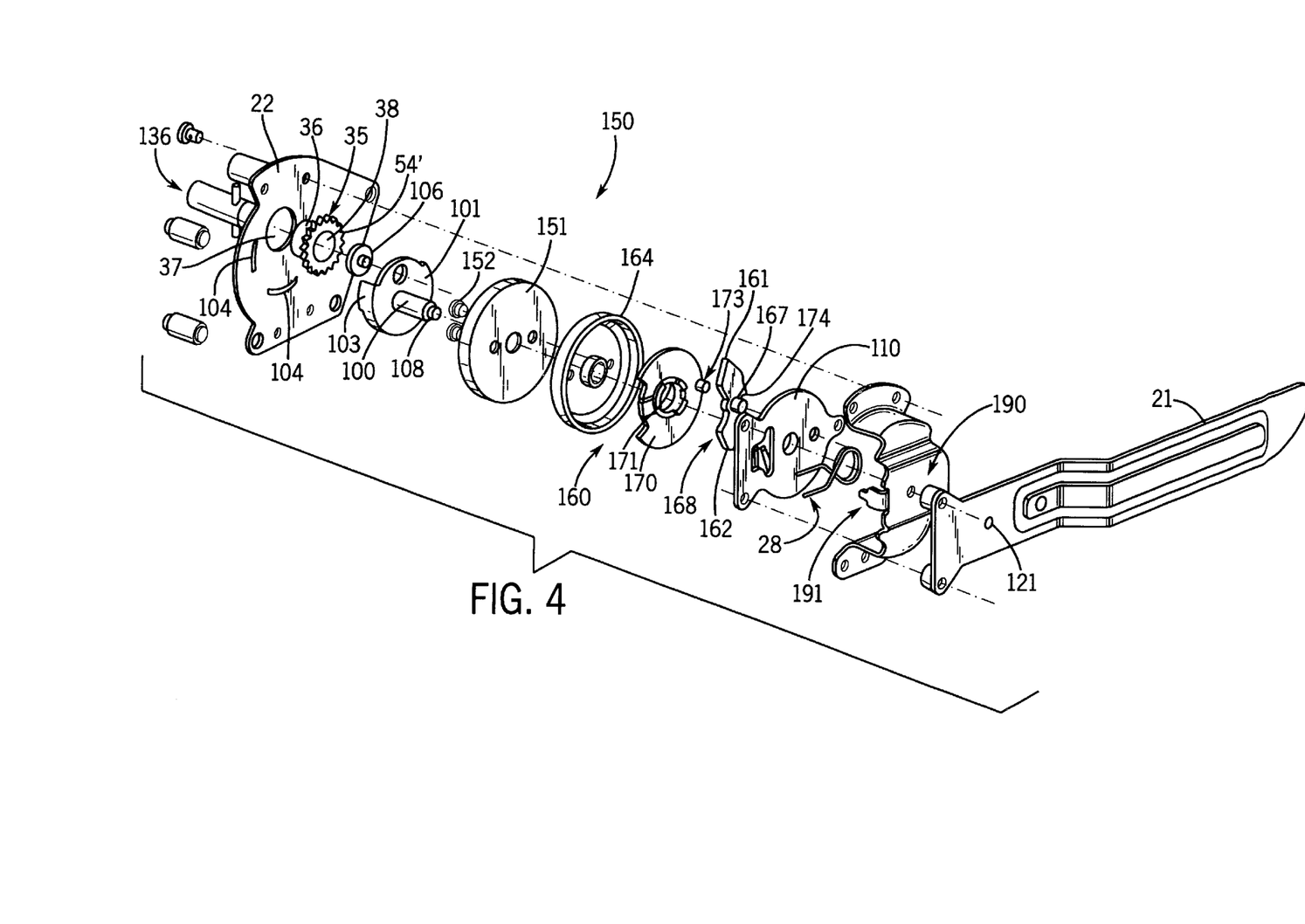
FIG. 4 is an exploded perspective view of the mechanism of an alternative embodiment of the present invention.
Figure 5:
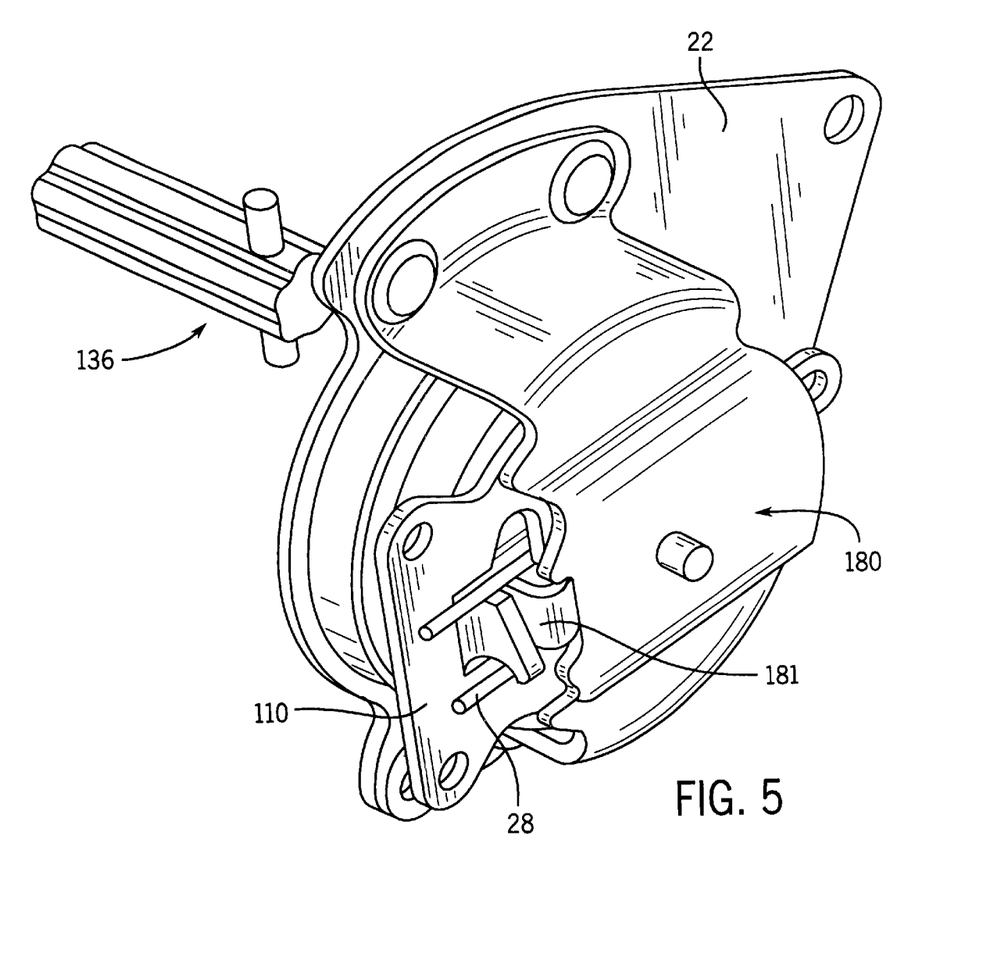
FIG. 5 is a perspective view of the mechanism of FIG. 4 when assembled.
Figure 6A:
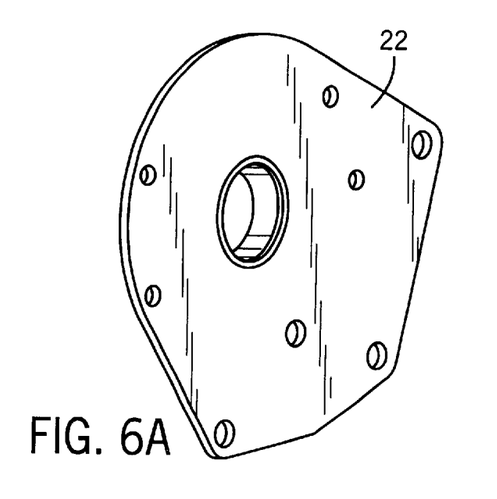
FIGS 6A to 6F show further views of a modification to the embodiment of FIG. 1.
Figure 6B:
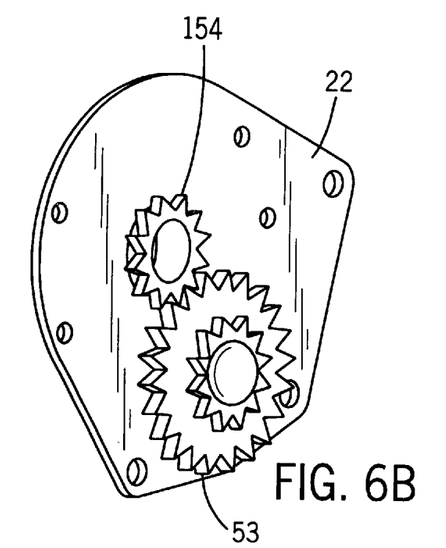
Figure 6C:
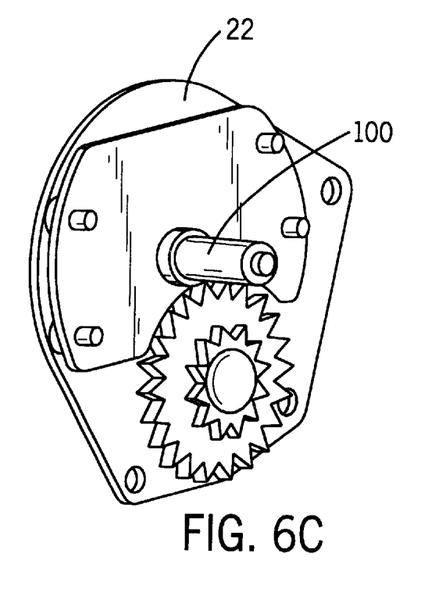
Figure 6D:
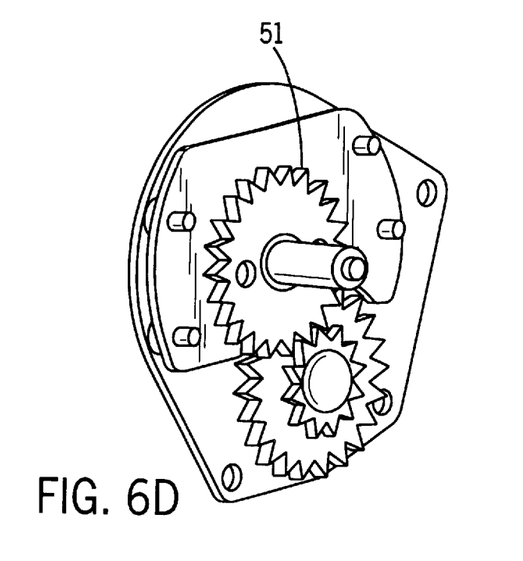
Figure 6E:
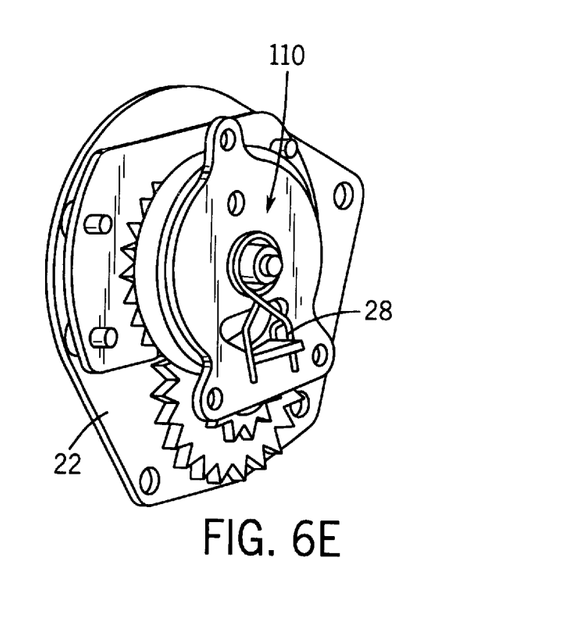
Figure 6F:
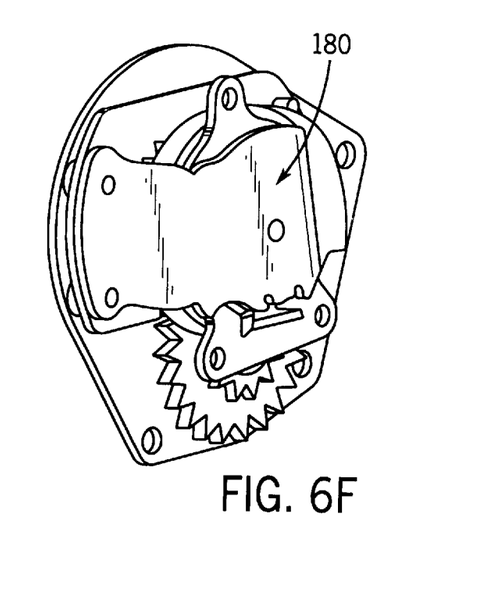

The mounting plate 101 carries a stub shaft 106 which is rotatably received in the open end of bore 38 to provide rotational support for shaft 36. A shaft coupler 136 is provided for drivingly connecting the shaft 36 to the rotary input of a seat reclining mechanism (not shown).

The drive transmission 150 in the embodiment of FIG. 4 includes a drive gear 54' and an internally toothed gear 151 which is rotatably mounted on the stub shaft 100.

Direction rotary drive means 160 include an internally toothed pawl wheel 164 which is rotatably mounted on shaft 100 and which is fixedly connected to gear 151 via rivets 152.

Housed within pawl wheel 164 is a pawl 168 having two pawl heads 161, 162. The pawl 160 is pivotally mounted on plate 110 via a stub shaft 167.

The pawl 168 is biased to a central rotational position whereat both pawl heads 161, 162 are spaced from the internal pawl teeth of pawl wheel 164. A pawl operating disc 170 is provided which is rotationally mounted on shaft 100.

The disc 170 carries a pin 173 which engages into a recess 174 formed on the pawl 168.

Accordingly, rotation of the disc 170 in one direction causes the pawl head 161 to engage the pawl wheel 164 whereas rotation of the disc 170 in the opposite direction causes the other pawl head 162 to engage the pawl wheel 164.

A torsion spring 171 is provided which is located on a tongue 191 formed on casing 190; the torsion spring 171 acting on the disc 170 to bias the disc 170 to a predetermined rotary position whereat pin 173 holds both pawl heads 161, 162 in a disengaged position relative to pawl wheel 164.

In use, when lever 21 is moved in one direction, the plate 110 is rotated in the same direction causing relative rotation between plate 110 and disc 170. This relative rotation causes one of the pawl heads to engage the pawl wheel 164 so that continued rotation of plate 110 causes rotation of the pawl wheel 164.

In the embodiment illustrated in FIG. 6, the lever and directional rotary drive means 160 is illustrated as being incorporated into the embodiment of FIG. 1 for driving the drive transmission 50.

In the embodiment illustrated in FIGS. 7A–7C and 8, the rotary output member 35 is driven by an epi-cyclic gear train 180.

Figure 8:
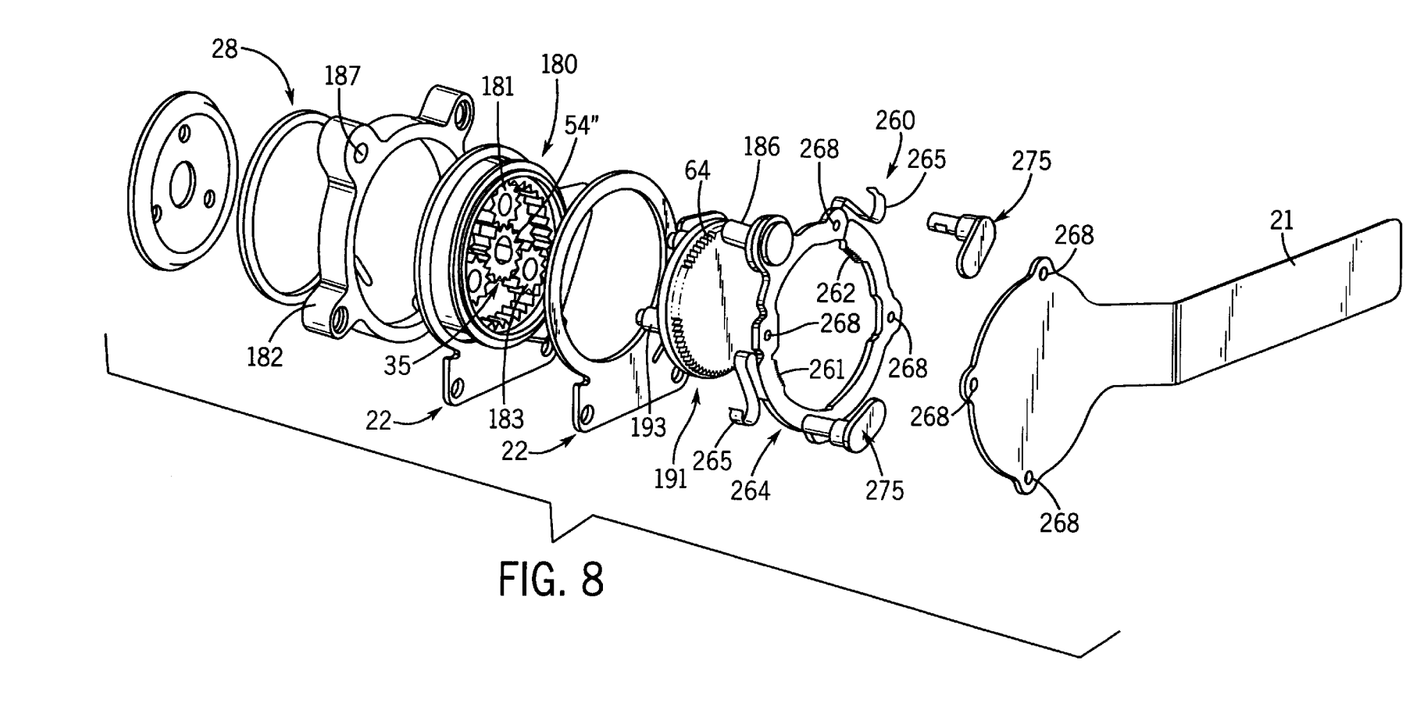
FIG. 8 shows an exploded perspective view of the embodiment of FIGS. 7A–7C.

The gear train 180 includes an internally toothed ring gear 181 which is fixedly mounted on a pair of mounting plates 22. A casing 182 is rotatably mounted on the outer surface of the ring gear 181.

The gear 54" is located co-axially with ring gear 181 and defines the sun gear of the epi-cyclic gear train.

Planetary gears 183, preferably three in number, are meshingly located between gears 54" and 181.

A planetary gear carrier 181 rotatably mounted on the casing 182. Internally the carrier 191 is provided with stub shafts 193 each of which rotatably carries a respective planetary gear 183.

Externally the carrier 191 is provided with a toothed pawl wheel 64.

A pawl assembly 260 is provided which includes a pawl annulus 264 pivotally mounted on casing 182 by a pin 186 received in a bore 187 formed in casing 182.

The internal wall of annulus 264 is provided with a pair of opposed pawl heads 261, 262. The inner diameter of annulus 264 is greater than the diameter of pawl wheel 64 so that both heads 261, 262 may be spaced therefrom simultaneously, i.e. in a desired pivotal position (a pawl non-engagement position) neither pawl 261, 262 is in engagement with the pawl wheel 64.

The annulus 264 is biased to its pawl non-engagement position preferably by a pair of opposed springs 265.

The lever 21 is fixedly attached to the annulus 264, by for example bolts (not shown) passing through aligned apertures 268.

Thus, displacement of the lever 21 is one direction initially causes the annulus 264 to pivot and bring one of the pawl heads 261, 262 into engagement with the pawl wheel 64.

Continued movement of the lever 21 causes the pawl wheel 64 and casing 182 to rotate in unison. Rotation of the pawl wheel 64 causes the planetary gears to be rotated around the ring gear 181 and so drive the output 35.

Guide arms 275 mounted on the casing 182 are provided for guiding the pivotal displacement of the annulus 264. A spring 28 is provided for biasing the lever 21 via casing 182 to a central rest position.

Figure 7A:
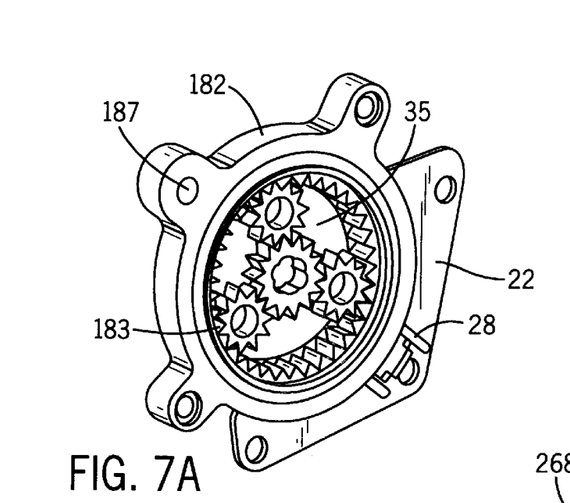
FIGS. 7A to 7C show further views of a further embodiment in different stages of assembly.
Figure 7B:
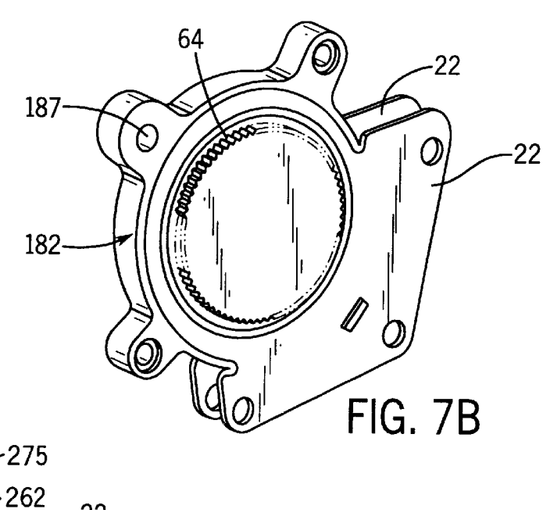
Figure 7C:
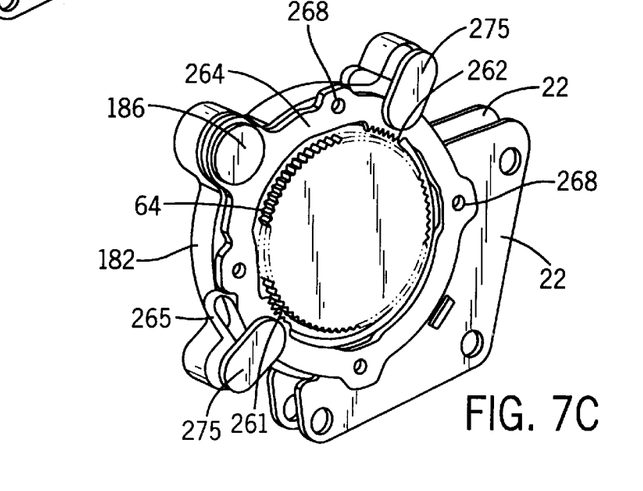

The arrangement of FIGS. 7 and 8 has an epi-cyclic gear train.

It will be appreciated that the lever operated drive mechanism of the present invention may be used to operate any type of continuously variable seat reclining mechanism which includes a rotary input.

I claim:

1. A lever operated rotary drive mechanism, the mechanism including a mounting frame carrying a rotary output member adapted for driving engagement with a rotary drive input, an operating lever pivotally mounted on the mounting frame for pivotal angular displacement relative to the frame, biasing means for biasing the lever to a rest angular position, the lever being movable within a first angular displacement region located on one side of said rest position and movable within a second angular displacement region located on the opposite side of said rest position and a drive transmission which drivingly connects the lever to the output member to cause rotation of the output member in one rotary direction only on displacement of the lever within said first angular displacement region and to cause rotation of the output member in the opposite rotary direction only on displacement of the lever within said second angular displacement region.

2. A mechanism according to claim 1 wherein the drive mechanism is arranged to enable incremental rotation of the rotary output member in said one direction or said opposite direction by repeated reciprocal strokes of said lever whilst within said first or second angular displacement regions respectively.

3. A mechanism according to claim 2 wherein the drive mechanism includes a pair of pawl heads movably mounted for engagement with a pawl wheel, said pawl wheel being in driving connection with said rotary output, both of said pawl heads being drivingly connected to said lever such that when the lever is at its rest angular position both pawl heads are disengaged from said pawl wheel, and when the lever is within its first angular displacement region one of said pawl heads engages with said pawl wheel and when the lever is within its second angular displacement region the other of said pawl heads is in engagement with the pawl wheel.

4. A mechanism according to claim 3 wherein said pair of pawl heads are pivotally mounted on said lever.

5. A mechanism according to claim 3 wherein said pair of pawl heads are pivotally mounted on a rotary plate drivingly connected to said lever, a pawl control disc being provided for controlling engagement of one or other of said pawl heads with said pawl wheel in dependence on relative rotation between said rotary plate and said control disc.

6. A mechanism according to claim 3 wherein said pair of pawl heads are mounted on a common annulus surrounding said pawl wheel, the annulus being biased about said pivot to reside at a position whereat both pawl heads are disengaged from the pawl wheel, the lever being attached to said annulus to cause pivotal displacement of the annulus to cause engagement of one or other of the pawl heads with the pawl wheel in dependence on the direction of displacement of the lever.

7. A reclinable seat having a seat cushion pivotally connected to a seat back, a continually adjustable seat reclining mechanism having a rotary input for causing operation of the seat reclining mechanism and a lever operated rotary drive mechanism according to any preceding claim drivingly connected to said rotary input.

* * * * *